(12) United States Patent  (10) Patent No.: US 7,540,738 B2
Larsson et al.  (45) Date of Patent: Jun. 2, 2009

(54) ARRANGEMENT FOR THE PRODUCTION OF A THREE-DIMENSIONAL PRODUCT

(75) Inventors: Morgan Larsson, Gothenburg (SE); Mikael Larsson, Molndal (SE)

(73) Assignee: Arcam AB, Mölndal (SE)

( * ) Notice: Subject to any disclaimer, the term of this patent is extended or adjusted under 35 U.S.C. 154(b) by 134 days.

(21) Appl. No.: 10/538,276

(22) PCT Filed: Dec. 10, 2003

(86) PCT No.: PCT/SE03/01932

§ 371 (c)(1),
(2), (4) Date: Nov. 16, 2005

(87) PCT Pub. No.: WO2004/054743

PCT Pub. Date: Jul. 1, 2004

(65) Prior Publication Data

US 2006/0141089 A1 Jun. 29, 2006

(30) Foreign Application Priority Data

Dec. 13, 2002 (SE) .................................... 0203684

(51) Int. Cl.
*B28B 17/00* (2006.01)
(52) U.S. Cl. .................... 425/375; 425/174.4; 264/308; 264/401

(58) Field of Classification Search ............... 425/174.4, 425/375; 264/308, 401; 700/118
See application file for complete search history.

(56) References Cited

U.S. PATENT DOCUMENTS

| 5,252,264 | A | * | 10/1993 | Forderhase et al. | ......... 264/497 |
| 5,637,175 | A | * | 6/1997 | Feygin et al. | ............... 156/264 |
| 5,647,931 | A | | 7/1997 | Retallick et al. | |
| 2004/0026807 | A1 | * | 2/2004 | Andersson et al. | ......... 264/40.1 |

FOREIGN PATENT DOCUMENTS

WO WO-01/81031 A1 11/2001

* cited by examiner

*Primary Examiner*—Maria Veronica D Ewald
(74) *Attorney, Agent, or Firm*—Birch, Stewart, Kolasch & Birch, LLP

(57) ABSTRACT

The invention relates to an arrangement for the production of a three-dimensional product, which arrangement comprises a work bench on which the said three-dimensional product is to be constructed, a powder dispenser which is arranged to apply a thin layer of powder onto the work bench to create a powder bed, an irradiation gun for transmitting energy to the powder so that melting of the powder takes place, the arrangement comprising a casing within which the pressure is reduced in relation to the atmospheric pressure and within which the work bench and the irradiation gun are located, with the powder dispenser, or a supply pipe connected to the powder dispenser, being arranged partially outside the casing.

8 Claims, 3 Drawing Sheets

ARRANGEMENT FOR THE PRODUCTION OF A THREE-DIMENSIONAL PRODUCT

TECHNICAL FIELD

The invention relates to an arrangement for the production of a three-dimensional product, which arrangement comprises a work bench on which the said three-dimensional product is to be constructed, a powder dispenser which is arranged to apply a thin layer of powder onto the work bench to create a powder bed, an irradiation gun for transmitting energy to the powder so that melting of the powder takes place, the arrangement comprising a casing within which the pressure is reduced in relation to the atmospheric pressure and within which the work bench and the irradiation gun are located.

BACKGROUND ART

In, for example, U.S. Pat. No. 4,863,538 an arrangement is already known for the production of a three-dimensional product by melting in succession selected parts of a layer of powder applied on a work bench. The arrangement comprises a work bench on which the said three-dimensional product is to be constructed, a powder dispenser which is arranged to apply a thin layer of powder onto the work bench to create a powder bed, an irradiation gun for transmitting energy to the powder whereby melting of the powder takes place, means for guiding the radiation emitted by the irradiation gun over the said powder bed to create a cross-section of the said three-dimensional product by melting parts of the said powder bed, and a control computer in which information about a succession of cross-sections of the three-dimensional product is stored. By melting selected parts of powder layers that have been applied in succession, the three-dimensional product is constructed. The control computer is intended to control means for deflecting the radiation generated by the irradiation gun over the powder bed according to an operating plan which reproduces a predetermined pattern. When the required areas of a layer of powder have been melted according to the operating plan, a cross-section of the said three-dimensional body has been created. A three-dimensional product is created by melting in succession cross-sections that are created in succession in layers of powder that are applied in succession by the powder dispenser.

The arrangement according to U.S. Pat. No. 4,863,538 is designed for the manufacture of three-dimensional bodies in various kinds of material, for example metal or plastic. With certain materials, however, problems arise with unwanted side-reactions. An arrangement has therefore been designed which comprises a casing within which the work bench, powder dispenser and irradiation gun are arranged. Within this casing the pressure is reduced, so that a vacuum arises. In this way, side reactions are avoided.

However, a problem has arisen associated with replenishing powder in the powder dispenser. For replenishing, the vacuum chamber must be opened, powder replenished, the vacuum chamber closed and a vacuum created again. This procedure involves a stoppage in the manufacturing process. In addition, the product on the work bench is able to cool. This means, among other things, that the fusion of the different layers is impaired and that the next layer of powder can therefore adhere less strongly. Cracks can arise in the product.

There is thus a need to solve these problems associated with replenishing the powder in the arrangement.

DISCLOSURE OF INVENTION

The problems described above are solved by means of the invention by means of the powder dispenser being arranged partially outside the casing. This is arranged according to the invention by a part of the powder dispenser being arranged outside the casing and another part inside the casing. In this way, powder can be added to the powder dispenser without the manufacturing process needing to be interrupted.

It has the same effect for the invention if a supply pipe is taken through the wall of the casing as when the powder dispenser is taken through the wall of the casing. An embodiment in which the powder dispenser is arranged inside the casing, but is connected to a supply pipe which is taken through the casing, is also covered by the invention.

In order to help to prevent an increase in pressure, the arrangement according to the invention comprises means for preventing the powder dispenser's contact with the surroundings affecting the pressure conditions inside the casing. The means for maintaining the pressure conditions inside the casing can, for example, be a column of powder inside the powder dispenser. Another means for maintaining the pressure conditions within the casing is to provide the powder dispenser with a cover with a valve. Such a cover with valve can, for example, be arranged on the top or at the bottom of the powder dispenser. It is, however, important in order for the pressure conditions inside the casing to be maintained that, when in use, the powder dispenser has constantly a column of powder of a certain height. The column of powder has preferably a height of 1000 mm. A 1000 mm high column of powder is sufficient to maintain the pressure conditions for a column of powder with a diameter of approx. 140 mm when the powder has a particle size that fulfils the following parameters. No particle has a diameter that exceeds 106 µm. Only a few particles have a diameter that is less than 40 µm. The majority of the particles (more than 50%) have a diameter that is 80 µm.

According to an embodiment of the invention, the arrangement comprises a first chamber, which encloses the work bench, and a second chamber, which encloses the irradiation gun, the chambers being located inside the casing and connected to each other via a duct. The powder dispenser is preferably arranged in association with the first chamber.

According to an embodiment of the invention, the arrangement comprises a means of supply in the form of a container with compartments which can be moved so that powder can be supplied to the powder dispenser from the different compartments.

DETAILED DESCRIPTION OF THE INVENTION

Figure 1:
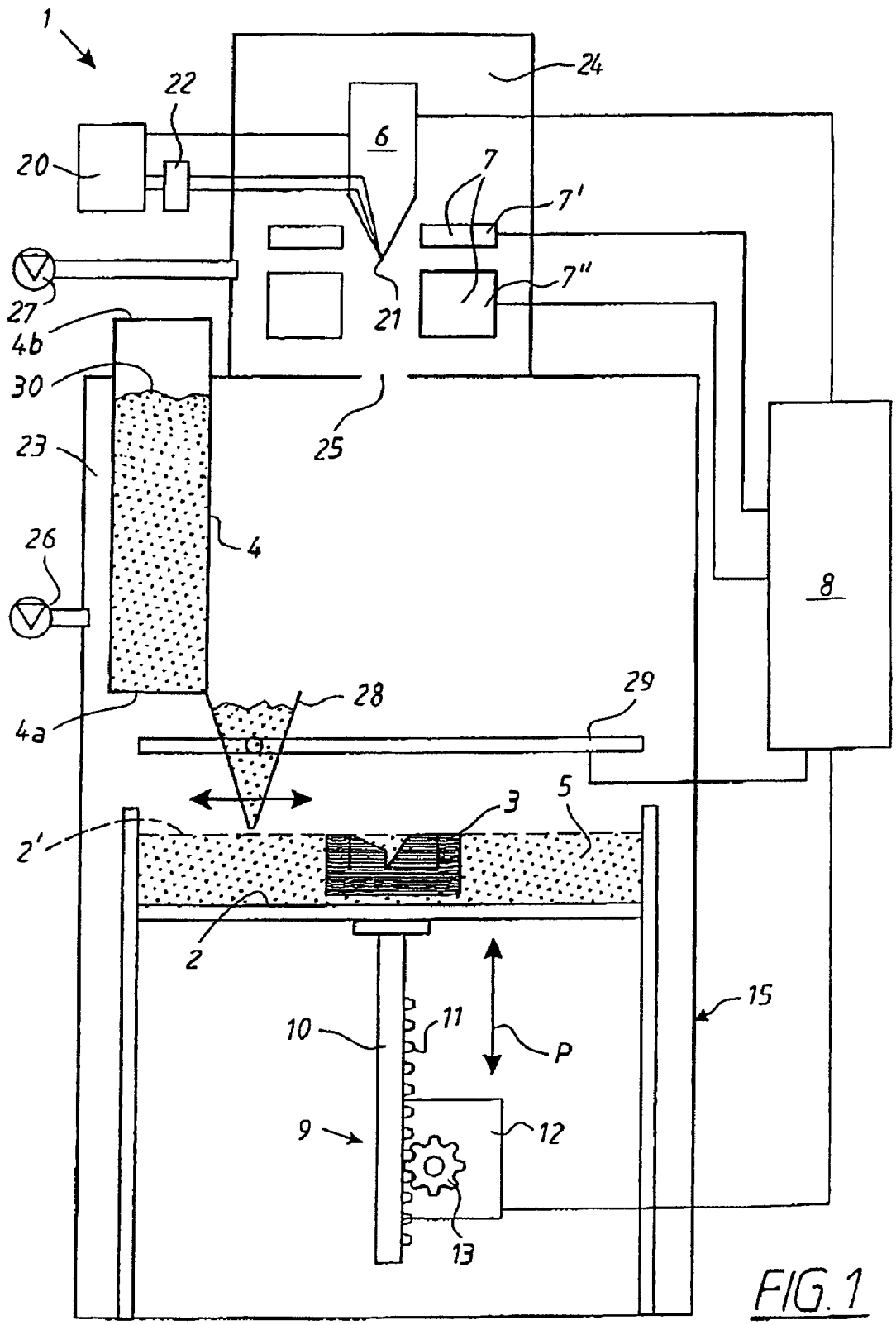
FIG. 1 shows an arrangement according to an embodiment of the invention viewed in cross-section.

FIG. 1 shows in cross-section an arrangement for the production of a three-dimensional product generally designated by 1. The arrangement comprises a work bench 2 on which a three-dimensional product 3 is to be constructed, a powder dispenser 4, and a device 28 which is arranged to apply a thin layer of powder onto the work bench 2 to create a powder bed 5, an irradiation gun 6 for transmitting energy to the powder bed whereupon melting of parts of the powder bed takes place, means for guiding 7 the radiation emitted by the irradiation gun 6 across the said work bench to create a cross-section of the said three-dimensional product by melting the said powder, and a control computer 8 in which information is stored about a succession of cross-sections of the three-dimensional product, which cross-sections build up the three-dimensional product. During a work cycle, according to the embodiment shown, the work bench will be gradually lowered in relation to the irradiation gun after each applied layer of powder. In order to make this movement possible, in a preferred embodiment of the invention, the work bench is arranged to be able to be moved in a vertical direction, that is in the direction that is indicated by the arrow P. This means that the work bench starts in an initial position 2' in a position where a first layer of powder of the necessary thickness has been applied. In order not to damage the underlying work bench and in order for this layer to be of a sufficient quality, this layer is made thicker than other layers which are applied on top, whereby melting right through of this first layer is avoided. Thereafter, the work bench is lowered in association with a new layer of powder being applied, to create a new cross-section of the three-dimensional product. For this purpose, in an embodiment of the invention, the work bench is supported on a stand 9 which comprises at least one rack 10 with teeth 11. A stepping or servo motor 12 provided with a cog wheel 13 sets the work bench 2 at the required height. Other arrangements known to experts in the field for setting the working height of a work bench can also be used. For example, adjusting screws can be used instead of toothed cogs. According to an alternative embodiment of the invention, means in the arrangement for applying the powder can be gradually raised, instead of lowering the work bench as in the embodiment described above.

The device 28 is arranged to interact with the said powder dispenser for replenishing it with material. In addition, the device 28 is arranged to sweep across the work surface in a known way by means of a servo motor (not shown), which moves the device 28 along a guide rail 29 which runs along the powder bed.

Upon the application of a new layer of powder, the thickness of the layer of powder will be determined by how much the work bench has been lowered in relation to the previous layer. This means that the layer thickness can be varied as required. It is therefore possible, where a cross-section has a large change of shape between adjacent layers, to make thinner layers whereby a higher degree of surface fineness is achieved and, when there is little or no change of shape, to make the layers the maximum penetration thickness for the radiation.

In a preferred embodiment of the invention, the irradiation gun 6 consists of an electron gun, with the means for guiding 7 the irradiation gun's radiation consisting of deflection coils 7". The deflection coil 7" generates a magnetic field, which guides the radiation generated by the electron gun, whereby melting of the surface layer of the powder bed in the required place can be achieved.

In addition, the irradiation gun comprises a high-voltage circuit 20 which is intended to provide the irradiation gun in a known way with an acceleration voltage for an emitter electrode 21 arranged in the irradiation gun. The emitter electrode is connected in a known way to a power source 22 which is used to heat up the emitter electrode 21 whereupon electrons are emitted. The function and composition of the irradiation gun is well known to an expert in the field.

The deflection coil is controlled by a control computer 8 according to an operating plan worked out for each layer that is to be melted, whereby guidance of the radiation according to the required operating plan can be achieved.

In addition, there is at least one focusing coil 7' which is arranged to focus the radiation on the surface of the powder bed on the work bench. Deflection coils and focusing coils can be arranged in a plurality of ways known to experts in the field.

The arrangement is enclosed in a casing 15 that encloses the irradiation gun 6 and powder bed 2. The casing 15 comprises a first chamber 23 which encloses the powder bed and a second chamber 24 which encloses the irradiation gun 6. The first chamber 23 and the second chamber 24 are connected to each other via a duct 25, which enables emitted electrons, which have been accelerated in the high-voltage field in the second chamber to continue into the first chamber in order to then strike the powder bed on the work bench 2.

The powder dispenser 4 is arranged in such a way that it is in contact with the surroundings by being partially arranged outside the casing 15 and partially inside. A first part 4a of the powder dispenser 4 is arranged in the first chamber 23 and a second part 4b is arranged outside the casing 15. The powder dispenser 4 can be replenished in batches or continually, without the casing 15 needing to be opened and the manufacturing process being interrupted.

The supply of powder to the powder dispenser 4 can be carried out in various ways. According to an embodiment (not shown in the figures), the powder is supplied using a screw on the powder dispenser 4. According to another embodiment (not shown in the figures), the powder is supplied to the dispenser 4 via a container with movable compartments. The movable compartments can be moved in such a way that an empty compartment can be moved away from the dispenser opening and replaced by a full compartment, whereupon replenishing of powder to the dispenser 4 can continue.

In one embodiment, the first chamber is connected to a vacuum pump 26 which reduces the pressure in the first chamber 23 to a pressure of preferably approx. $10^{-3}$-$10^{-5}$ mBar. The second chamber 24 is preferably connected to a vacuum pump 27 which reduces the pressure in the second chamber 24 to a pressure of approx. $10^{-4}$-$10^{-6}$ mBar. In an alternative embodiment, both the first chamber and the second chamber can be connected to the same vacuum pump.

In order that the vacuum that has been created within the casing 15 by the vacuum pumps 26, 27 will be retained or for there only to be an insignificant increase in pressure, it is important for the powder dispenser 4 to have a column of powder 30. Any increase in pressure that arises in spite of the column of powder 30 can be counteracted by the vacuum pumps 26, 27. The power that is required to counteract an increase in pressure is typically of the order of $1/100$ to $1/20$ of the maximum power that is required to create the original vacuum in the casing 15.

In addition, the control computer 8 is preferably connected to the irradiation gun 6 for controlling the emitted power of the irradiation gun and is connected to the stepping motor 12 for setting the height position of the work bench 2 between each consecutive application of a layer of powder, whereby the thickness of the individual layers of powder can be varied.

In addition, the control computer is connected to the said device 28 for applying the powder onto the work surface. This device is arranged to sweep across the work surface, whereby a layer of powder is applied. The device 28 is driven by a servo motor (not shown) which is controlled by the said control computer 8. The control computer controls the length of the sweep and ensures that powder is replenished when required. For this purpose, a load sensor can be arranged in the device 28, whereby the control computer can obtain information to the effect that the device is empty.

Figure 2:
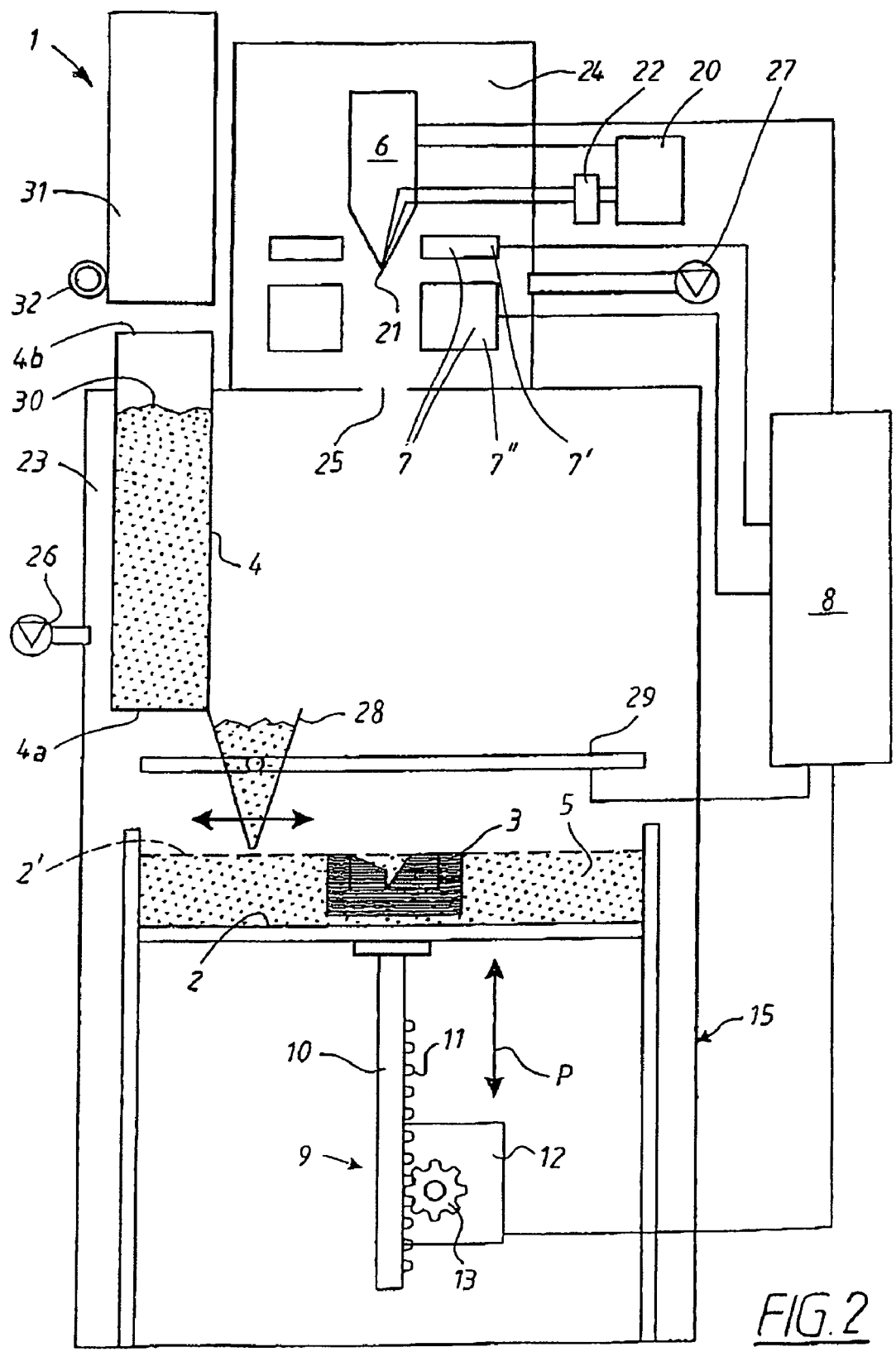
FIG. 2 shows an arrangement according to an embodiment of the invention viewed in cross-section.

FIG. 2 shows an arrangement 1 according to the invention viewed in cross-section. The arrangement 1 according to FIG. 2 corresponds to the arrangement according to FIG. 1, with the exception that the arrangement in FIG. 2 has, in addition, a supply device 31 for supplying powder to the powder dispenser 4 and a fixing device 32. The supply device 31 consists of a container which is arranged above the powder dispenser 4.

Figure 3:
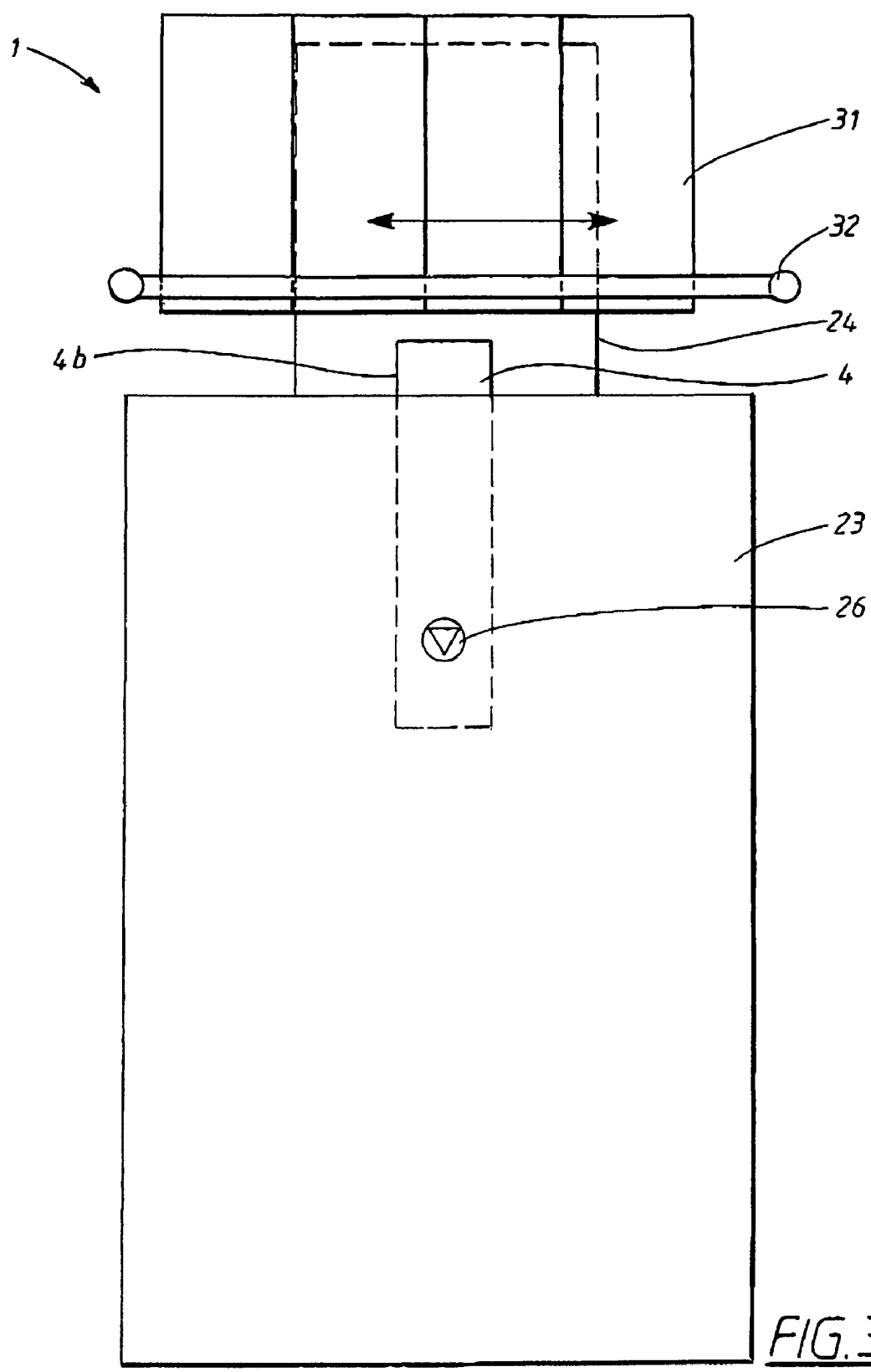
FIG. 3 shows the embodiment according to FIG. 2 from a different viewpoint.

FIG. 3 shows the arrangement 1 according to FIG. 2 viewed from the left in FIG. 2. In other words, in FIG. 3 the arrangement 1 is rotated through 90° to the right in relation to FIG. 2. The arrangement 1 in FIG. 3 is not shown in cross-section. The supply device 31 has a number of compartments and is arranged to be able to move on a fixing device 32. In this way, the supply device 31 can be moved from left to right, or vice versa, when a compartment is empty, in order to be able to replenish the powder dispenser 4 from a full compartment.

The embodiment described constitutes only one example of how the invention can be carried out. Other embodiments are also possible within the framework of what is described in the claims. For example, the arrangement can have more than one powder dispenser.

The invention claimed is:

1. An arrangement for the production of a three-dimensional product, which includes a work bench on which the said three-dimensional product is to be constructed, a powder dispenser which is arranged to apply a thin layer of powder onto the work bench to create a powder bed, an irradiation gun for transmitting energy to the powder so that melting of the powder takes place, the arrangement comprising:

a casing within which the pressure is reduced in relation to the atmospheric pressure and within which the work bench and the irradiation gun are located, wherein the powder dispenser is a continuous unit having a dispensing end and a powder refill end, where the dispensing end is disposed inside said casing and the powder refill end is disposed outside said casing such that a powder refill opening on the refill end is exposed to an ambient atmosphere outside said casing and such that the powder dispenser is thereby directly accessible from outside the casing for refill of powder material at any time during a production process without affecting pressure conditions inside the casing.

2. The arrangement as claimed in claim 1, wherein a column of powder in the powder dispenser acts as a pressure barrier between the inside of the casing and the environment outside the casing.

3. The arrangement as claimed in claim 2, wherein the column of powder has a height of 1000 mm.

4. The arrangement according to any one of the above claims, further comprising a first chamber, which encloses the work bench, and a second chamber, which encloses the irradiation gun, the chambers being located inside the casing and connected to each other via a duct.

5. The arrangement as claimed in claim 4, wherein the powder dispenser is arranged in association with the first chamber.

6. The arrangement according to claim 1, further comprising a supply device in the form of a container with compartments which can be moved so that powder can be supplied to the powder dispenser from the different compartments.

7. The arrangement of claim 1, the irradiation gun comprising an electron gun.

8. The arrangement of claim 1, wherein the powder refill opening includes a cover with a valve arranged on top of said powder dispenser.

* * * * *